Dec. 2, 1930. J. J. CROWE 1,783,412
METHOD AND APPARATUS FOR TESTING CYLINDERS
Filed Feb. 24, 1930 3 Sheets-Sheet 1
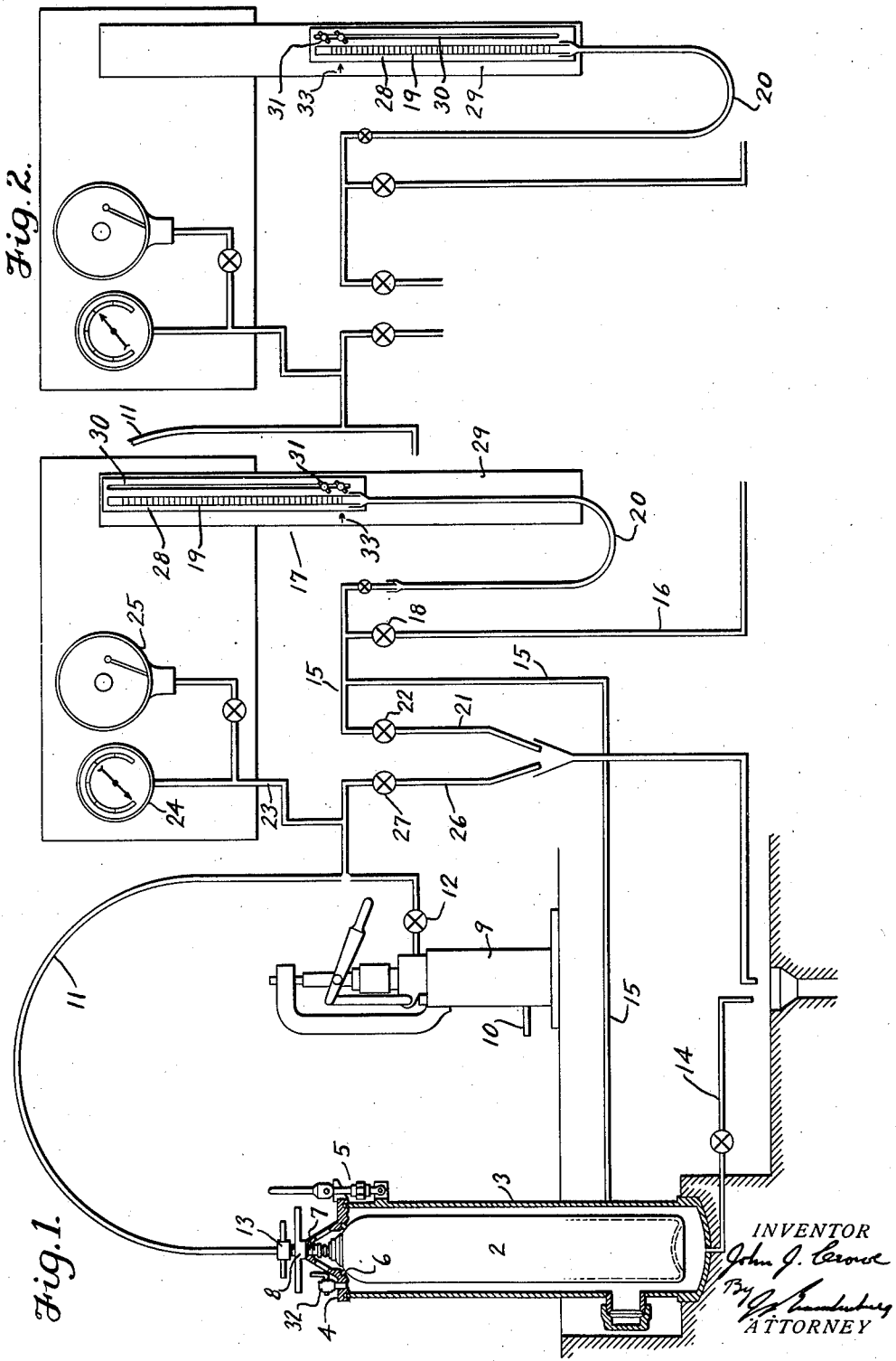

Dec. 2, 1930.    J. J. CROWE    1,783,412
METHOD AND APPARATUS FOR TESTING CYLINDERS
Filed Feb. 24, 1930    3 Sheets-Sheet 3
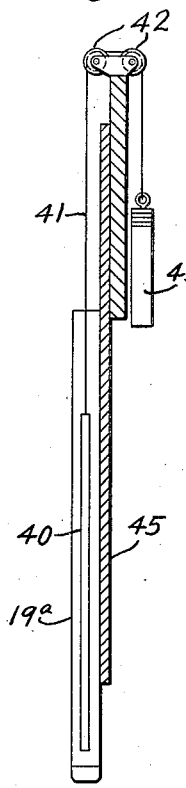
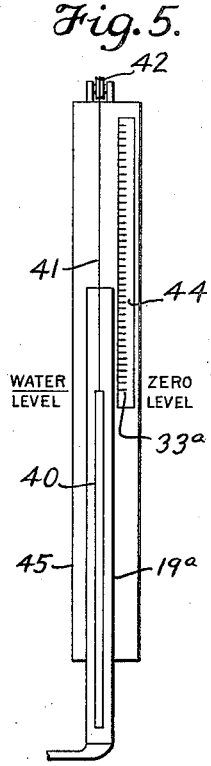
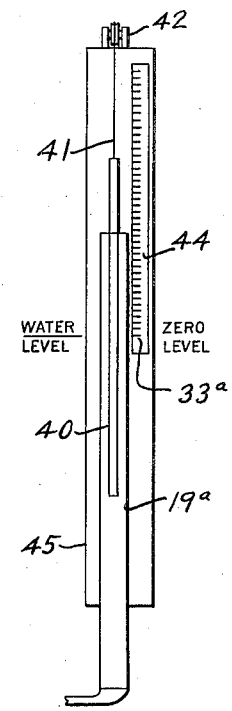
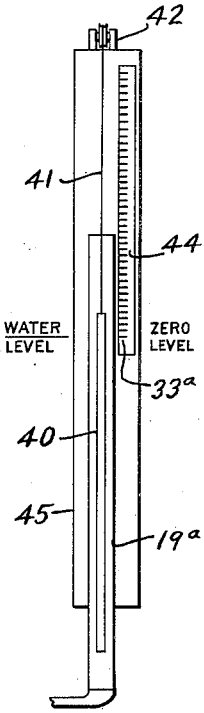
INVENTOR
John J. Crowe
BY
ATTORNEY Patented Dec. 2, 1930

1,783,412

UNITED STATES PATENT OFFICE

JOHN J. CROWE, OF WESTFIELD, NEW JERSEY, ASSIGNOR TO AIR REDUCTION COMPANY, INCORPORATED, OF NEW YORK, N. Y., A CORPORATION OF NEW YORK

METHOD AND APPARATUS FOR TESTING CYLINDERS

Application filed February 24, 1930. Serial No. 430,478.

It is necessary to test at stated intervals the cylinders which are used to hold compressed gases. The test consists in immersing the cylinder in a tight water-jacket, applying a predetermined pressure to the interior of the cylinder, taking a reading on an expansion indicator, this being the total expansion reading, then releasing the pressure from the cylinder and taking another expansion reading, this being the permanent expansion reading. The difference between the total expansion and the permanent expansion is the elastic expansion of the cylinder at the test pressure, and the ratio of permanent expansion to total expansion has been taken as the guide for determining whether the cylinder is to remain in service. I have satisfied myself that the elastic expansion is a more reliable index of wall-thickness, and it is an object of this invention to provide means for ascertaining not merely the true total expansion and the true permanent expansion, but also the true difference, which is the elastic expansion.

The ordinary expansion indicator is a burette, or glass tube with a graduated scale, connected by a pipe with the interior of the water-jacket. The water column in the indicator stands at a relatively high level when the total expansion reading is taken, and at a relatively low level when the permanent expansion reading is taken. I find that the resulting difference in hydrostatic pressures introduces substantial error, owing to compression of air trapped in the concave bottom of the cylinder and possibly elsewhere in the jacket, and also to the fact that the jacket and its cover yield to an extent to the hydrostatic pressure. The readings are dependent on the amount of water expelled from the jacket by the total expansion of the cylinder, or which does not return to the jacket when pressure is released from the cylinder (permanent expansion). Any height of the water column above the initial level, that is to say the level at which it stood before pressure was applied to the interior of the cylinder, corresponds to an amount of hydrostatic pressure over and above that initially acting on trapped air and on the water-jacket and this amount of hydrostatic pressure subtracts from the amount of water which should be expelled from the jacket or be prevented from returning to it. The consequence is that neither reading is a true reading, the top of the column being too low in each instance, and that the difference between them does not give the true elastic expansion.

It would appear that considerations such as these have been overlooked hitherto, notwithstanding the importance of keeping a reliable check on the condition of cylinders, which are required to hold safely very high gas pressures.

The object of my invention is to provide a method and apparatus for testing gas cylinders, by means of which a substantially accurate test can be made easily. The invention involves the simple step of leveling the top of the liquid in the indicator to the zero level for each reading. This means that the column is leveled not only to the same level for each reading, but that this level is the zero level, namely the level at which the liquid stood before the cylinder within the water-jacket was expanded by the application of pressure to its interior. The height of the zero level with relation to the water-jacket is not vital, and indeed there might be a different zero level for each test, depending upon the amount of water admitted to the system. In the latter event a zero level index or pointer could be adjusted to the initial level of the liquid in the indicator. It is much simpler, however, to have a fixed zero level, and after the cylinder is in place in the jacket and water has been admitted to the jacket and to the indicator, to draw off water from the indicator through a valved vent, or otherwise regulate the level of water in the indicator so that the top of the column is at the zero level mark. In the accompanying drawings the fixed zero level is shown even with the top of the water-jacket, that being preferable.

The leveling of the column in the indicator to the zero level may be accomplished in either of two ways, both of which are applications of the same plan. In one form the glass indicator tube and its scale are mounted on a board so that they can be adjusted vertically, in order to bring the top of the column to the zero level before taking each reading. In the other form the tube or vessel is supported in a stationary manner, and a rod suspended in the tube is raised or lowered for each reading so as to cause the level of the liquid to coincide with the zero level. This leveling rod affords at the same time, in connection with a scale, a reading of the expansion of the cylinder.

In the accompanying drawings forming part hereof:

Fig. 1 is a schematic view illustrating one form of the apparatus;

Fig. 2 is a view of part of the apparatus, showing the expansion indicator adjusted to a lowered position;

Fig. 4 is a sectional view taken on the line 4—4 of Fig. 3; and

Figs. 5, 6 and 7 are elevations of the expansion indicator of this form, showing different positions of the leveling and indicating rod.

Figure 3:
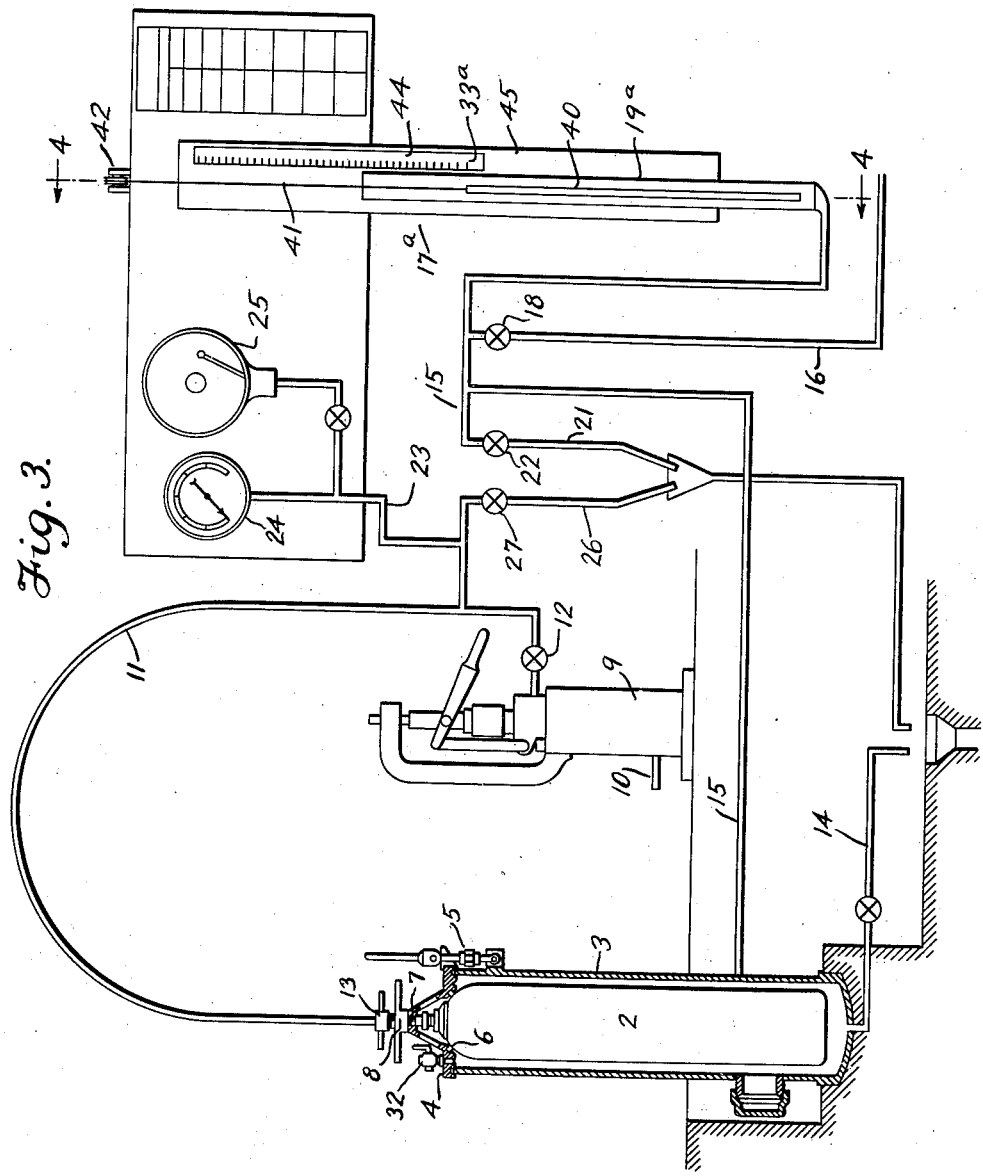
Fig. 3 is a schematic view of another form of the apparatus.

Figs. 1 and 2 will first be described. 2 is a cylinder to be tested. 3 is a water-jacket into which the cylinder is lowered, 4 is a removable cover for the water-jacket. The cover can be drawn tight to the top of the jacket by three or more clamps 5, one of which is shown. A gasket between the cover and the jacket will be understood. The cover is also provided with a circular gasket 6 to bear on the top or shoulder of the cylinder around its neck.

Before the cylinder is tested, its valve is screwed out of its neck, and a special connection 7 is screwed into the neck. This connection, or tube, will pass freely through a hole in the cover. A wing-nut 8 screwed onto this connection and against the top of the cover draws the cover and the top of the cylinder together and makes a tight joint where the gasket 6 presses against the top of the cylinder.

The cylinder and the cover having been thus assembled, the cylinder is introduced into the water-jacket and the cover is fastened tight to the top of the jacket, leaving the cylinder suspended in the jacket.

9 is a pressure pump having an inlet 10 for liquid, and 11 is a conduit leading from the pressure side of the pump and containing a valve 12. 13 is a union for connecting the end of the conduit 11 with the special connection 7 screwed into the neck or outlet of the cylinder to be tested.

14 is a valved drain pipe leading from the bottom of the water-jacket.

15 is a pipe line connecting the interior of the water-jacket with the city water supply represented by the pipe line 16, and with the expansion indicator 17. 18 is a valve between the water supply line 16 and the line 15.

The indicator used in this form of the apparatus comprises a graduated glass tube 19 open at the top, and 20 is a flexible tube connecting the lower end of the glass tube with the line 15. The graduated glass tube 19 is a form of burette.

The line 15 is connected with a drain pipe 21, having a valve 22. This is a valved vent or draw-off for the indicator vessel.

The line 11 connected with the pressure side of the pump 9 is connected by a branched line 23 with a pressure gauge 24 and a recording gauge 25. There is also a drain outlet 26 from this line provided with a valve 27.

The vessel 19 of the expansion indicator is fastened to a board 28 which is slidable vertically on a supporting board 29. The vessel can be adjusted up or down to any position within the necessary range, to be held at any such position. Thus, for example, the board 28 may have a vertical slot 30, and the stationary board may be provided with screw-threaded studs carrying wing nuts 31. Loosening of these nuts enables the board 28 to be raised or lowered, and clamping of the nuts secures the indicator at the desired height.

The operation is as follows: The cylinder 2 has been suspended in the water-jacket 3, the cover 4 has been clamped tight, and the cylinder has been connected with the pressure line 11, as previously described. The valves 12, 14, 27, 22 and 18 are closed at this time.

A pet-cock 32 in the cover 4 of the water-jacket outside the circuit of the gasket 6 is opened. The valve 18 is opened and water flows into the water-jacket. When water issues from the pet-cock 32 showing that the space in the water-jacket outside of the cylinder is filled, the pet-cock is closed, and the valve 18 is closed. As a result of the filling operation, the water in the vessel 19 of the expansion indicator probably stands higher than the fixed zero level index mark 33 on the stationary support 29. The vent valve 22 is therefore manipulated to draw off liquid from the indicator column until its top descends to the zero level index, whereupon the valve 22 is closed. At this time, the zero mark on the scale of the vessel 19 should be opposite the fixed zero level mark or index 33.

Pump 9 is then operated, valve 12 being open, until the gauge 24 shows the predetermined gauge pressure. Valve 12 is closed.

The pressure applied to the interior of the cylinder 2 caused the cylinder to expand. This expansion expelled water from the water-jacket 3 through the line 15 causing the column in the vessel 19 of the expansion indicator to rise. However, a reading is not taken at this elevation. When all expansion has ceased at the predetermined test pressure, the board 28 carrying the graduated vessel is lowered on the fixed board 29, until the top of the column of indicating liquid is even with the zero level mark 33, at which position the board 28 is clamped or left frictionally or otherwise supported.

It may be assumed that this position is shown in Fig. 2.

The height of the liquid in the vessel 19 as indicated by its scale is then noted. This represents the total expansion of the cylinder 2.

The indicator board 28 is then preferably raised. The valves 12 and 27 are then opened, relieving the cylinder 2 of pressure. The cylinder contracts, increasing the space in the water-jacket 3, and water is drawn back into the jacket from the indicator tube or vessel 19. This, of course, causes the liquid to fall in the indicator vessel, but a reading is not taken at this position of the indicator. When the cylinder has contracted as much as it will, the indicator carrier 28 is adjusted downward until the top of the indicating water column is again at the zero level 33.

At this position of the indicator another reading is taken on its scale. This reading represents the permanent expansion of the cylinder.

Both the total and the permanent expansion readings having been taken at the reference zero level 33, which was the level at which liquid stood in the indicator before pressure was applied to the inside of the cylinder 2, the compression of any air in the hollow bottom of the cylinder or elsewhere in the water-jacket, and any expansion of the water-jacket, due to hydrostatic pressure, is the same at each reading as it was before the cylinder was expanded; hence no error is introduced, and subtraction of the permanent expansion from the total expansion will give the true elastic expansion, which indicates to what extent the wall thickness has become reduced in service and is a reliable basis on which to pass or reject the cylinder tested.

In Figs. 3 to 7 much of the system is the same as that which has been described.

In this case, the glass tube or vessel 19ª of the expansion indicator 17ª is stationary. Therefore, the flexible tube connection 20 of the other form, which is a possible source of error, is eliminated.

Inside the glass tube 19ª a leveling and indicating rod 40 is suspended on a wire or cable 41. This wire passes over pulleys 42 and thence downward to a counterweight 43, which will cause the rod to remain at any height to which it is raised or lowered. A scale 44 is provided on the fixed board 45. The zero mark 33ª on this scale is, or may be, the fixed or reference zero level index. Instead of a stationary scale, a scale may be placed on the rod, but in either case there will be a fixed zero level index.

The rod may initially be placed with its top at the zero level 33ª, though this is not important.

It will be assumed that the rod is initially adjusted so that its upper end is even with the fixed zero level. This is the position indicated in Figs. 3, 4 and 5.

The cylinder is placed in the water-jacket, the water-jacket is filled with water, which also enters the tube 19ª of the indicator, and enough water is drawn off from the latter by means of the valve 22 to cause the column in the indicator to stand even with the fixed zero level, all as described in connection with the other form of the apparatus.

The test pressure is put on the interior of the cylinder 2. This drives water upward in the tube 19ª. When all expansion has ceased, the rod 40 is raised until the reduced displacement causes the liquid in the vessel 19ª to recede to the fixed or reference zero level 33ª (Fig. 6). The amount of the rod that was withdrawn from the liquid corresponds to the amount of liquid that was expelled from the water-jacket 3. In other words, it is necessary only to graduate the scale 44 in a proper manner to read the total expansion on this scale by reference to the rod. Thus, if the rod were one square centimeter in cross-section, the graduations on the scale would be a centimeter apart in order to give readings in cubic centimeters. If the rod is of such length as not to be submerged, readings may be taken up to a reference mark on the rod instead of to the top of the rod. Manifestly there may be a mark or index on or connected with the wire to cooperate with a stationary scale, or vice-versa.

If pressure were now released from the cylinder 2, the liquid in the indicator tube would fall below the zero level 33ª. When it had ceased falling, the rod would be lowered until its displacement brought the top of the column back to the zero level.

It is somewhat better to lower the rod before pressure is released from the cylinder. This raises the top of the liquid column above the zero level, so that when pressure is let out of the cylinder the column will descend toward the zero level. Then the rod is raised until the liquid level coincides with the fixed zero level (Fig. 7).

In either event a permanent expansion reading is taken on the scale 44, the reading corresponding to a length of the rod exposed, and being interpreted by the scale in suitable units.

Manifestly, there may be certain other modifications.

It will be apparent that the invention is applicable to the testing of gas cylinders, pressure vessels in general, or other vessels which it may be desirable to test at various pressures, as, for example, in the illustrated case where the particular purpose is to ascertain the total expansion at a given test pressure, the permanent expansion at atmospheric pressure, and from these the elastic expansion at the test pressure.

The advantages of my invention result from the provision of a water-jacket and indicating apparatus for testing gas cylinders, pressure vessels, etc., in which the hydrostatic pressure in the jacket is made the same for readings (or recordings) of the expansions at various pressures applied to the interior of the vessel.

What is claimed as new is:

1. The method of testing cylinders in which the cylinder to be tested is enclosed in a water-jacket the interior of which is connected with an expansion indicator, and predetermined pressure is applied to the interior of the cylinder and afterwards released, total and permanent expansion readings being taken on the indicator before and after such release of pressure, characterized in that the top of the column of water in the expansion indicator is leveled to the same zero level for each reading.

2. Apparatus for testing cylinders, comprising a tight water-jacket to receive a cylinder to be tested, means for applying pressure to and releasing pressure from the interior of the cylinder, an open expansion indicator connected with the interior of said water-jacket, and means for leveling the top of the column of water in said indicator to the same zero level before and after pressure is released from the cylinder.

3. Apparatus for testing cylinders, comprising a tight water-jacket to receive a cylinder to be tested, means for applying pressure to and releasing pressure from the interior of the cylinder, an open expansion indicator connected with the interior of said water-jacket, valved means for adjusting the top of the column of liquid in said indicator to a fixed zero level, and means for levelling the top of the column to said zero level before and after pressure is released from the cylinder.

4. Apparatus for testing cylinders, comprising a tight water-jacket to receive a cylinder to be tested, means for applying pressure to and releasing pressure from the interior of the cylinder, an open expansion indicator connected with the interior of said water-jacket, a support, and means connecting said indicator to said support in such manner that the indicator can be adjusted vertically to level the top of its column of liquid to a fixed zero level before and after release of pressure from the cylinder.

5. Apparatus for testing cylinders, comprising a tight water-jacket to receive a cylinder to be tested, means for applying pressure to and releasing pressure from the interior of the cylinder, an open expansion indicator connected with the interior of said water-jacket, said indicator comprising a vessel and a rod suspended therein, with means for raising and lowering said rod, whereby said rod serves to level the top of the column of water in said vessel to a zero level before and after release of pressure from the cylinder, and in accordance with its adjustments the total and permanent expansions of the cylinder are read.

JOHN J. CROWE.